United States Patent [19]

Torres et al.

[11] Patent Number: 4,981,038

[45] Date of Patent: Jan. 1, 1991

[54] DEPLOYABLE PROBE

[75] Inventors: Mark J. Torres; Melvyn S. White, both of Bognor Regis; Ken Rendle, Worthing; Mike Lamdin, Selsey; James S. Johnston, Bognor Regis, all of England

[73] Assignee: Rosemount Limited, England

[21] Appl. No.: 514,676

[22] Filed: Apr. 25, 1990

[30] Foreign Application Priority Data

May 8, 1989 [GB] United Kingdom ............... 8910536

[51] Int. Cl.$^5$ ............................................. G01C 21/10
[52] U.S. Cl. ......................................... 73/182; 73/756; 73/861.65
[58] Field of Search ................ 73/182, 183, 861.65, 73/861.66, 861.67, 861.68, 756, 179

[56] References Cited

U.S. PATENT DOCUMENTS 3,228,247  1/1966  Hansen et al. .................... 73/182

FOREIGN PATENT DOCUMENTS 2164159  3/1986  United Kingdom .
2171526  8/1986  United Kingdom .

Primary Examiner—Donald O. Woodiel
Attorney, Agent, or Firm—Kinney & Lange

[57] ABSTRACT

The invention relates to a deployable probe for measuring fluid pressures such as pitot and/or static pressure. The probe comprises an outer tubular casing, a probe member telescopically extendible from within the outer casing, spring means urging the probe member to extend longitudinally from an undeployed position which is wholly contained within the outer casing, a latch retaining the probe member in the undeployed position and releasable to deploy the probe, and extendible communicating means interconnecting the probe member and the outer tubular casing for supplying pressure indications from the probe member when the probe is deployed.

13 Claims, 4 Drawing Sheets

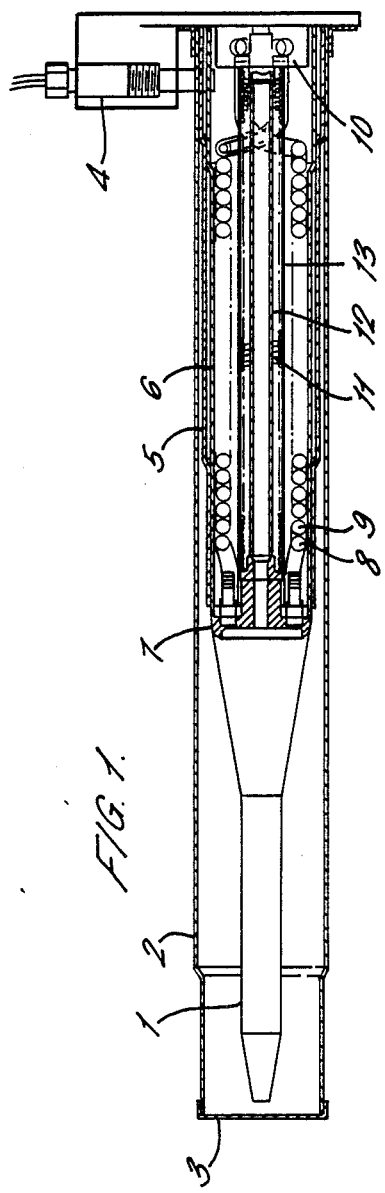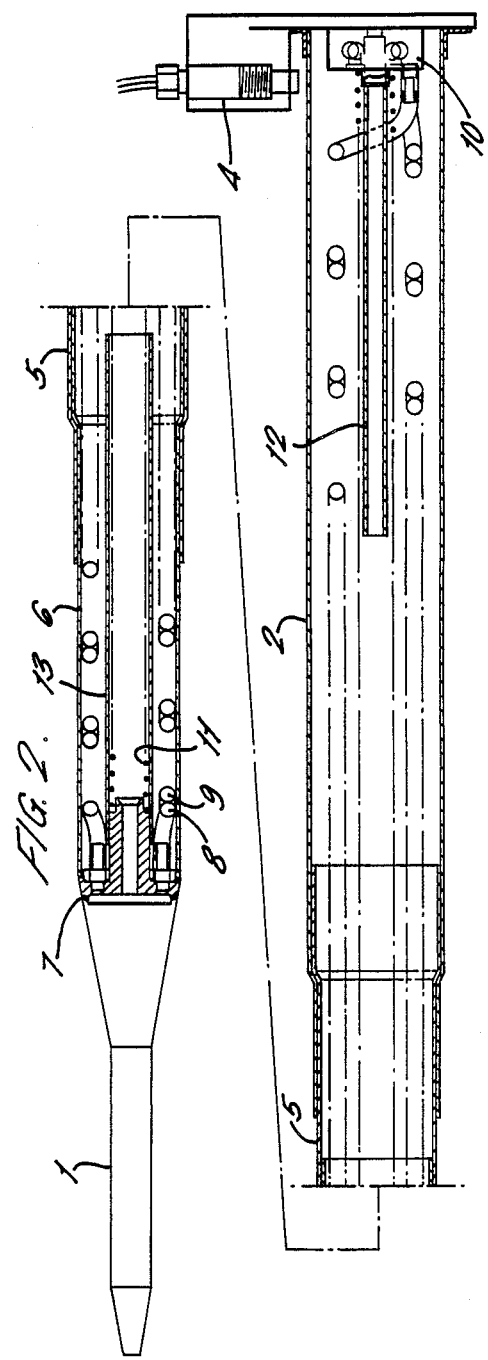

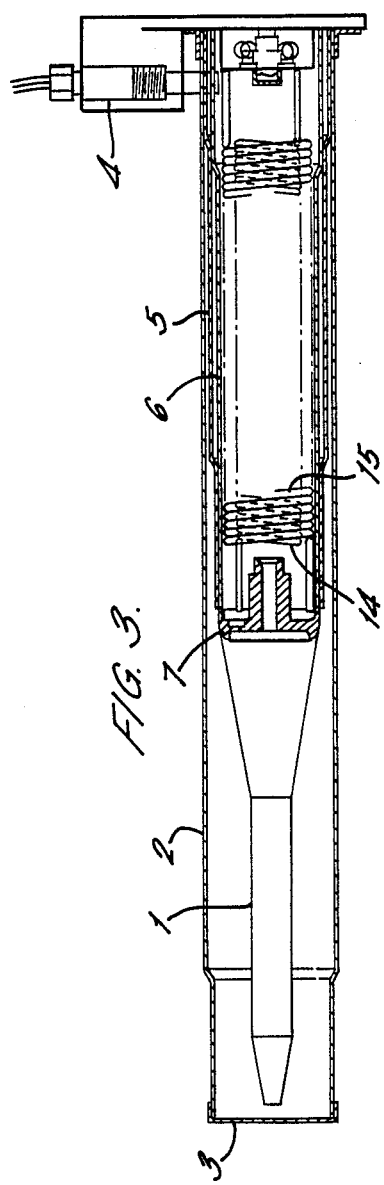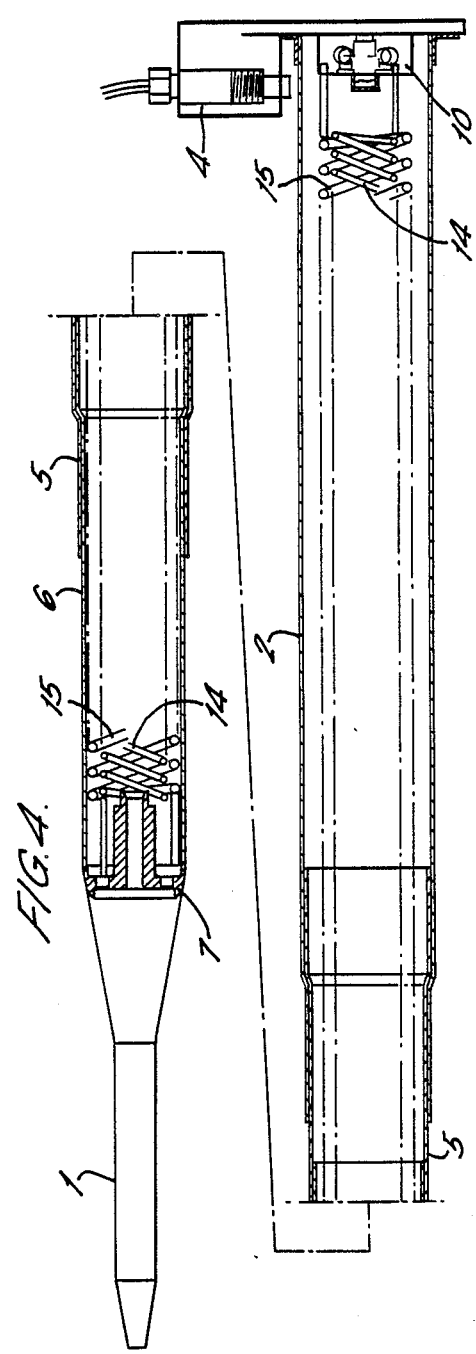

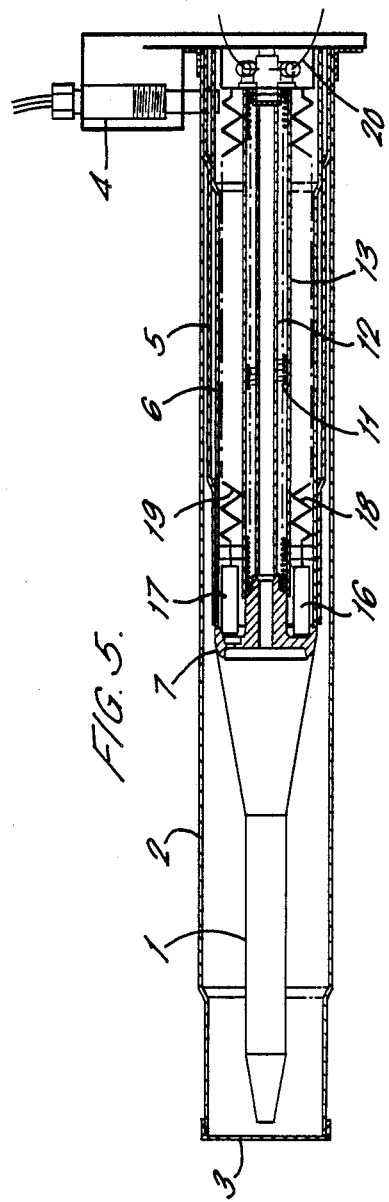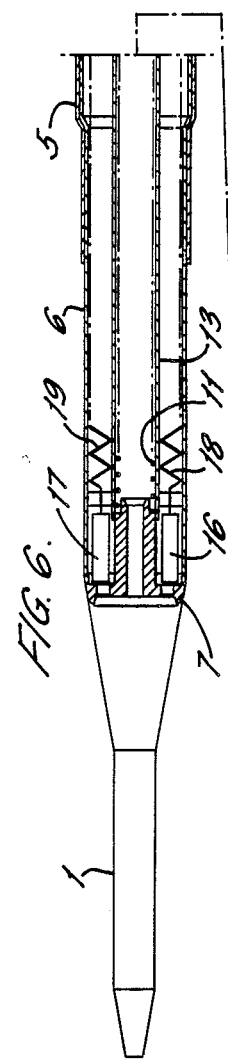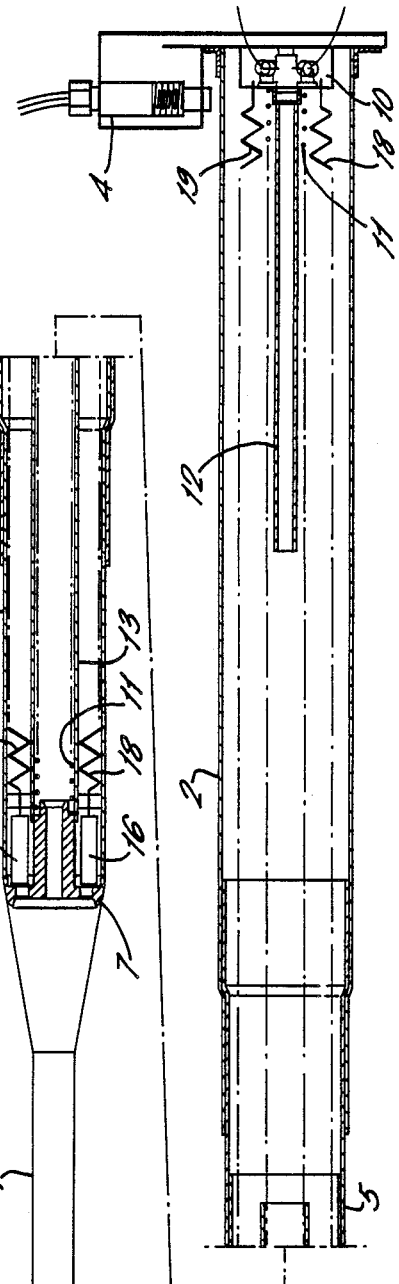

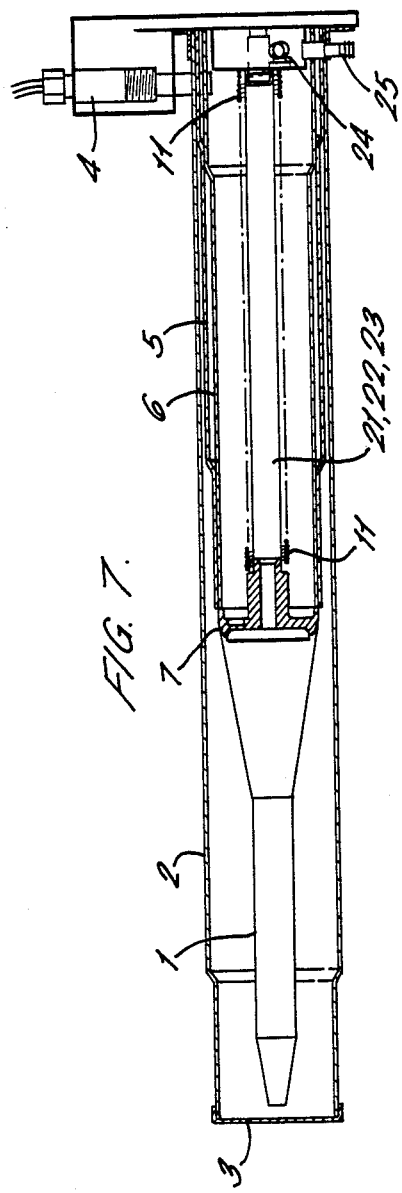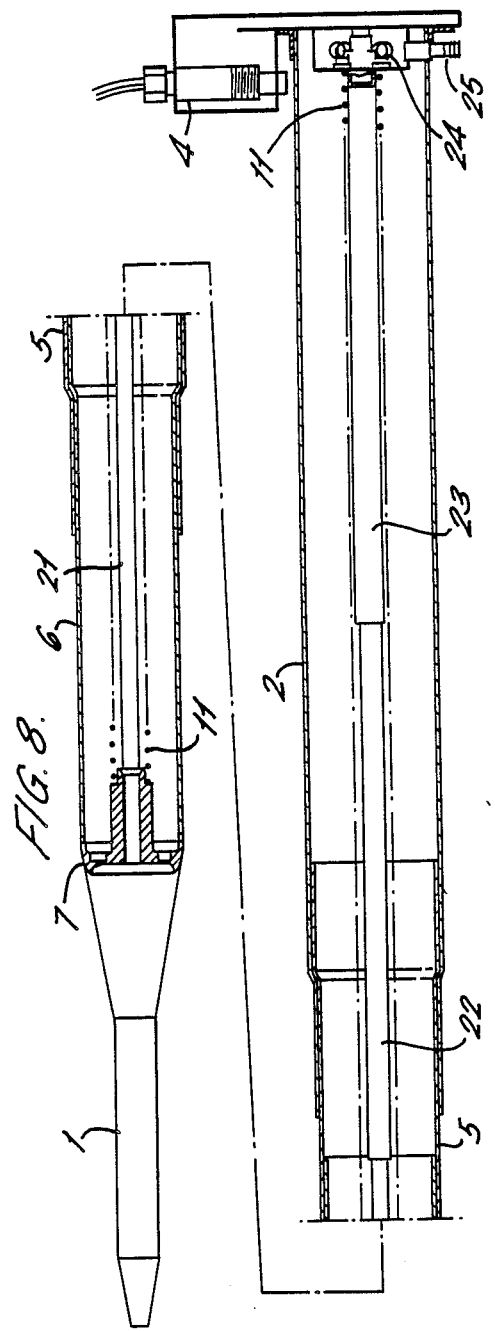

DEPLOYABLE PROBE

This invention relates to a deployable probe for measuring fluid pressures such as pitot and/or static pressures, which is capable of being stowed within a confined space. Such probes are commonly known as "air pressure data systems" when used for measuring air pressure. It will be appreciated that altitude and angle of attack may also be determined by measuring such fluid pressures.

Pitot static probes are devices that are well known in the aerospace industry for providing a measure of air speed for aircraft. Pitot static probes are usually mounted permanently on the aircraft in such a position that they are forward of any pressure wave or turbulence.

Pitot static probes are however fragile, any mechanical damage to these probes drastically effecting the accuracy of the readings obtained. There is therefore an advantage in having the probe stowed in a protective housing whilst the vehicle or aircraft on which it is mounted is in storage or transit until such a time as it is deployed in flight. For example, in the case of a missile, it is desirable to have a probe which deploys from the main body of the missile after launch.

According to this invention there is provided a deployable probe for measuring fluid pressure, comprising an outer tubular casing, a probe member telescopically extendable from within the outer tubular casing, spring means urging the probe member to extend longitudinally from an undeployed position which is wholly contained within the outer casing, a latch retaining the probe member in the undeployed position and releasable to deploy the probe, and extendible communicating means interconnecting the probe member and the outer tubular casing for supplying pressure indications from the probe member when the probe is deployed.

Conveniently, said spring means comprises a compressed helical spring. Then, in one embodiment, said compressed helical spring is constructed from a resilient tube providing at least part of said communicating means. Alternatively, said communicating means may include at least one flexible tube interconnecting the member and the outer tubular casing.

In another arrangement, said communicating means may include at least one pressure transducer mounted on the probe member and electrically connected by flexible cables to utilisatior circuitry which is fixed relative to the outer tubular casing.

Where a helical spring is used, the tube preferably includes at least one cylindrical guide mounted to restrict lateral movement of the helical spring when compressed. This may be especially important to prevent the spring damaging any flexible tubes or wiring employed for communicating the pressure indications. An external or internal guide may be used or both, in which latter case, one is mounted in the probe member and the other on the outer tubular casing.

In further embodiments, the probe member may form an hermetic seal with the outer tubular casing when the probe is deployed and the interior of said outer casing forms at least part of said communicating means. Also, said communicating means may include a telescopically extending tube located within said outer tubular casing and hermetically sealed when extended with the probe deployed.

It should be appreciated that each of the above described forms of extendible communicating means may be employed with any other forms where more than one pressure indication is required.

Conveniently, the latch comprises an explosively actuated retractor pin. The probe may include a frangible seal covering the open end of the outer tubular casing when the probe member is in the undeployed position.

Examples of the present invention will now be described with reference to accompanying drawings in which:

FIG. 1 illustrates a first embodiment of the invention in the undeployed position;

FIG. 2 illustrates the embodiment illustrated by FIG. 1 in the deployed position;

FIG. 3 illustrates a second embodiment of the invention in the undeployed position;

FIG. 4 illustrates the embodiment illustrated by FIG. 3 in the deployed position;

FIG. 5 illustrates a third embodiment of the invention in the undeployed position;

FIG. 6 illustrates the embodiment illustrated by FIG. 5 in the deployed position;

FIG. 7 illustrates a fourth embodiment of the invention in the undeployed position;

FIG. 8 illustrates the embodiment illustrated by FIG. 7 in the deployed position.

Referring now to FIGS. 1 and 2, in this embodiment the deployable probe comprises an outer tubular casing 2 closed at one end by a rear bulkhead 10, and sealed at the open end by a protective frangible seal 3 which, when the deployable probe is mounted in a vehicle or aircraft will lie flush with the surface of the said vehicle or aircraft.

These components wholly enclose a pitot static probe member 1. The probe member 1 is slidable in inner telescopic tube members 5 and 6 which are in turn slidable within the outer casing. A compressed helical spring 11 is constrained within internal and external cylindrical guides 12 and 13 respectively and urges the probe member 1 to the fully telescopically extended position shown in FIG. 2. The internal tubular guide 12 is attached to the rear bulkhead 10 and the external tubular guide 13 is attached to the probe member base 7 and both lie along the cylindrical axis of the pitot probe. This arrangement prevents the spring from deviating laterally whilst in undeployed position and also during the initial phase of deployment. Lateral deviation of the spring 11 may cause damage to other components within the outer casing, specifically the flexible tubes or wiring employed for communicating the pitot and static pressure indications.

The spring 11 is restrained from deploying the probe member 11 by a releasable latch comprising an explosively actuated retractor pin 4.

Two flexible coiled tutes 8 and 9 are tightly packed when in the undeployed position, and positioned internally of the outer tubular casing 2 and the inner telescopic members 5 and 6. These flexible coiled tubes 8 and 9 are helically coiled along the cylindrical axis between the inner telescopic members 5 and 6 the outer spring guide 13 and are hermetically connected at the probe member base 7 and the rear bulkhead 10. Accordingly, these coiled tubes 8 and 9 provide means of communicating fluid pressures such as pitot and static pressure, from the probe member 1 to connections at the rear bulkhead 10, when the probe member 1 is in the deployed position.

When the explosively actuated retractor pin 4 is activated the urging force of the spring 11 is released allowing it to expand, forcing the probe member 1 to extend to the deployed position shown in FIG. 2, rupturing the frangible seal 3 in the process. Pitot and static pressures, measured by the probe member 1 beyond the pressure wave and turbulence created by the carrying vehicle or aircraft, can now be communicated to the rear bulkhead 10 for detection by suitable pressure sensors.

Referring now to FIGS. 3 and 4, the embodiment illustrated by these figures contains many features previously described using FIGS. 1 and 2. The helical spring 11 and spring guides 12 and 13 are omitted as are the flexible tubes 8 and 9. In their place, and replacing their function, is a pair of concentric helically coiled steel tubes 14 and 15. The coiled steel tubes 14 and 15 are arranged such that they lie along the cylindrical axis of the probe, between the base 7 of the probe member 1 and the rear bulkhead 10, within the inner telescopic members. These tubes 14 and 15 form a hermetically sealed connection at the probe member base 7 and at the rear bulkhead 10 in order that they can communicate the pitot and static pressures from the probe member 1 to the rear bulkhead 10, when the probe member 1 is deployed. The steel tubes 14 and 15 have the dual function of providing the force to urge the probe member 1 to deploy and of providing the communicating means for the pitot and static pressures from the probe member 1 when the probe member is in the deployed position.

Referring now to FIGS. 5 and 6, the embodiment illustrated by these figures contains many features previously described using FIGS. 1 and 2. The helical spring 11 used to urge the probe member 1 to the deployed position and its guides 12 and 13 are retained, but the means of communicating the pitot and static pressure signals from the probe member 1 to the rear bulkhead 10 are replaced by two minature pressure transducers 16 and 17 e.g. solid state transducers. These are positioned on the probe member 1 adjacent to the base 7 within the telescopic member 6, and are connected to the rear bulkhead 10 by flexible coiled cables 18 and 19. The pitot and static pressure signals detected by the transducers 16 and 17 are then communicated to the carrying vehicle or aircraft by cables 20.

Referring now to FIGS. 7 and 8, the embodiment illustrated by these figures contains many features previously described using FIGS. 1 and 2. The helical spring 11 used to urge the probe member 1 to the deployed position is retained but the spring guide 12 is modified such that it comprises three telescopic members 21,22 and 23, that hermetically seal when in the deployed position illustrated by FIG. 8. The telescopic member 21 is hermetically connected to the probe member 7, as is the telescopic member 23 to the rear bulkhead 10, thus providing a single channel of communication for the pitot pressure from the probe member 1 to the rear bulkhead 10 when the probe is in the deployed position.

The outer tubular casing 2 and inner telescopic members 5 and 6 hermetically also seal when in the deployed position. Thus the static pressure is communicated between the probe member 1 and the rear bulkhead 10, when in the deployed position, by the chamber provided between the inner telescopic members 21,22 and 23 and the outer tubular casing 2 and telescopic members 5 and 6. The pitot and static pressures are accessible to the carrying vehicle or aircraft from connectors 24 and 25 respectively.

It should be noted that any of the aforementioned communication means may be used individually or combined with each other to form a multiplicity of communication channels between the probe member 1 in the deployed position and the carrying vehicle or aircraft.

We claim:

1. A deployable probe for measuring fluid pressure, comprising an outer tubular casing, a probe member telescopically extendable from within the outer tubular casing, spring means urging the probe member to extend longitudinally from an undeployed position which is wholly contained within an outer casing, a latch retaining the probe member in the undeployed position and releasable to deploy the probe, and extendible communicating means interconnecting the probe member and the outer tubular casing for supplying pressure indications from the probe member when the probe is deployed.

2. A deployable probe as claimed in claim 1 wherein said spring means comprises a compressed helical spring.

3. A deployable probe as claimed in claim 2 wherein said compressed helical spring is constructed from a resilient tube providing at least part of said communicating means.

4. A deployable probe as claimed in claim 2 wherein said communicating means includes at least one flexible tube interconnecting the probe member and the outer tubular casing.

5. A deployable probe as claimed in claim 2 wherein said communicating means includes at least one pressure transducer mounted on the probe member and electrically connected by the flexible cables to utilization circuitry which is fixed relative to the outer tubular casing.

6. A deployable probe as claimed in claim 2 including at least one cylindrical guide mounted to restrict lateral movement of the helical spring when compressed.

7. A deployable probe as claimed in claim 6 and including an external said guide containing the helical spring when compressed.

8. A deployable probe as claimed in claim 7 and including an internal said guide located within the helical spring.

9. A deployable probe as claimed in claim 8 wherein one of the internal and the external said guides is fixed to the probe member and the other thereof is fixed to the outer tubular casing.

10. A deployable probe as claimed in claim 1 wherein the probe member forms an hermetic seal with the outer tubular casing when the probe is deployed and the interior of the said outer casing forms at least part of said communicating means.

11. A deployable probe as claimed in claim 1 wherein the said communicating means includes a telescopically extending tube located within said outer tubular casing and hermetically sealed when extended with the probe deployed.

12. A deployable probe as claimed in claim 1 wherein the latch comprises an explosively actuated retractor pin.

13. A deployable probe as claimed in claim 1 including a frangible seal covering the open end of the outer tubular casing when the probe member is in the undeployed position.

* * * * *